United States Patent
Öhlén

(10) Patent No.: US 9,356,694 B2
(45) Date of Patent: May 31, 2016

(54) METHOD AND APPARATUS FOR CHANGING A MODE IN AN OPTICAL NETWORK

(75) Inventor: Peter Öhlén, Stockholm (SE)

(73) Assignee: Telefonaktiebolaget LM Ericsson (Publ), Stockholm (SE)

(*) Notice: Subject to any disclaimer, the term of this patent is extended or adjusted under 35 U.S.C. 154(b) by 385 days.

(21) Appl. No.: 13/805,019

(22) PCT Filed: Jun. 18, 2010

(86) PCT No.: PCT/SE2010/050694
§ 371 (c)(1),
(2), (4) Date: Dec. 18, 2012

(87) PCT Pub. No.: WO2011/159212
PCT Pub. Date: Dec. 22, 2011

(65) Prior Publication Data
US 2013/0089322 A1    Apr. 11, 2013

(51) Int. Cl.
*H04B 10/079* (2013.01)
*H04B 10/572* (2013.01)

(52) U.S. Cl.
CPC ........ *H04B 10/07957* (2013.01); *H04B 10/572* (2013.01)

(58) Field of Classification Search
CPC .............. H04B 10/50–10/501; H04B 10/503; H04B 10/506; H04B 10/572
USPC ................................................. 398/182–201
See application file for complete search history.

(56) References Cited

U.S. PATENT DOCUMENTS

| 2004/0033022 A1 | 2/2004 | Althaus et al. |
| 2004/0202472 A1* | 10/2004 | Giles et al. ..................... 398/75 |
| 2005/0058460 A1* | 3/2005 | Wang ............................. 398/195 |
| 2007/0280681 A1 | 12/2007 | Frankel et al. |
| 2010/0208592 A1* | 8/2010 | Matsuoka ............... H04L 49/40 370/241 |
| 2012/0093502 A1* | 4/2012 | Gottwald et al. ............... 398/27 |

FOREIGN PATENT DOCUMENTS

| GB | 2 466 212 A | 6/2010 |
| JP | 2004325128 A * | 11/2004 ............. G01N 21/39 |

* cited by examiner

*Primary Examiner* — David Payne
*Assistant Examiner* — Casey Kretzer
(74) *Attorney, Agent, or Firm* — Patent Portfolio Builders, PLLC

(57) ABSTRACT

A method at a transmitter of a tunable laser of controlling a mode change of the laser during a transmission of data to a receiver of a terminating node is based on the determination of a time instance for initiation of the mode change on the basis of the state of the tunable laser. In addition, buffer occupancy and/or the state of the data transmission may be considered when determining such a time instance. In addition, data of the data transmission is buffered during the mode change, such that data loss is avoided during the change of mode. A transmitter is also provided which can execute the suggested mode changing method.

9 Claims, 10 Drawing Sheets

METHOD AND APPARATUS FOR CHANGING A MODE IN AN OPTICAL NETWORK

TECHNICAL FIELD

The present invention relates generally to a method and an apparatus for handling a mode change in a transmitter arranged in an optical network.

BACKGROUND

While there are multiple network structures capable of supporting broadband services, an ever increasing percentage of broadband providers are opting for fiber optic network structures to support both present and future bandwidth requirements. Cable television (CATV), High Definition Television (HDTV), Voice Over Internet Protocol (VOIP), and broadband internet are some of the most common applications now being supported by fiber optic networks, in some cases directly to the home, commonly referred to as Fiber To The Home (FTTH) or to a building, by applying the Fiber To The Building (FTTB), or Fiber To The Curb (FTTC) concept. These different types of fiber optic networks, which provides different distances between the optical fiber and the end-users, incorporate a wide variety of product to support and distribute the signal from a central office to an optic node, and ultimately to the subscriber, or end-user.

FIG. 1 is a simplified system overview of a fiber-based broadband network, such as e.g. a fiber-based broadband access network 100 according to the prior art, which is based on a single fiber configuration connecting an Optical line Terminal (OLT) 101, having the purpose of distributing broadband services, to an intermediate node, a splitter 102, which is arranged to transmit data in the downlink via one wavelength $\lambda_{DI}$ and in the uplink via another wavelength $\lambda_{UI}$, in order to enable the OLT 101 to provide two way communication between the OLT and the client side, in the present case represented by Optical Network Units (ONU's) 103a . . . 103n. Each ONU 103a . . . 103n receive and transmit data by the use of time-division multiplexing (TDM), while the splitter 102 splits the available power equally among its different output port.

In the field of fiber-based broadband access, Wavelength Division Multiplexing Passive Optical Networks (WDM-PON) are often seen as being the next step after current PON systems which are based on TDM multiplexing, such as e.g. 10G PON, Gigabyte-capable Passive Optical Networks (GPON), Ethernet Passive Optical Networks (EPON) systems which are currently being developed. The implementation of cost-effective WDM-PON is however still a critical issue and a number of other issues are still to be solved before WDM-PON systems which are based on standardized technology can compete commercially with presently available network solutions.

A simplified system overview of a WDM PON system according to the prior art is illustrated in FIG. 2, where, in resemblance to FIG. 1, an OLT 201 is interconnected to a plurality of ONU's 203a . . . 203n. For the WDM PON system, however, the splitter has been replaced by a Wavelength Multiplexer/Demultiplexer (W MUX) 202 which is used in the downstream to separate wavelength channels $\lambda_{DI1}, \lambda_{DI2}, \ldots \lambda_{DIn}$ destined for the different ONUs 203a . . . 203n. In a corresponding way each ONU 203a . . . 203n is using a separate wavelength channel $\lambda_{UI1}, \lambda_{UI2}, \lambda_{UIn}$ for transmission of data upstreams. As an alternative to ONUs, Optical Network Terminals (ONTs) may be used, where the former devices are used for distribution to a plurality of subscribers in a FTTB or FTTC context, or as backhaul technology, while the latter devices are configured to support one single subscriber, e.g. by applying the FTTH concept. In the downlink, each of the different wavelength channels $\lambda_{DI1}, \lambda_{DI2} \ldots \lambda_{DIn}$ are provided via a respective separate transmitter (not shown) provided in the OLT 201. In addition, wavelength channels provided from different ONU's, or ONTs, in the upstream direction may be combined in the WMUX 202 in a corresponding way.

It is also recognized that there exist alternative architectures for WDM-PON systems, which combine the concepts described above. In a hybrid WDM/TDM PON system, a wavelength mux/demux is used as in FIG. 2. In the hybrid WDM/TDM PON system however the drop fiber also has a passive splitter, connecting several ONUs to each downstream wavelength channel where data is multiplexed with TDM on top of the wavelength channel. Similarly, a group of ONUs connected to this downstream channel share a common upstream channel where the data is again multiplexed using a TDM approach, e.g. based on a GPON-like protocol. A further variant of a WDM-PON system is that the wavelength selective element, which is located in the ONU, is configured as a fixed or tunable filter which selects the proper downstream channel. In this case a passive power splitter can be used to connect the drop fibers to the feeder fiber. Consequently, the application of the method and arrangement suggested in this document is thus not limited to the architectures shown in FIG. 1-2, but also other combinations of common optical technologies could be used by those skilled in the art to create further variants to a fiber access system based on WDM.

As already indicated above, WDM PON arrangement require high initial implementation costs. One important reason for this comes from the need of expensive optical components in the transmitters and receivers both at the OLT and at the client side, i.e. at the ONU/ONT.

It is therefore desired to provide equipment suitable for WDM PON systems which can be of limited complexity, such that the investment cost for such an infrastructure is limited.

It is important that the ONU/ONT is colorless, which means that the upstream wavelength can be adjusted to any of the wavelength channels used in the system. Different distribution port in the WMUX determine which wavelength channel that is used at a specific ONU/ONT. One way to realize a colorless ONU/ONT is to use a tunable laser for the transmission of data. Also at the OLT, tunable lasers can be used, where one tunable laser may be dedicated for each wavelength port. Alternatively, an integrated array of wavelength stabilized laser transmitters or any other known technique suitable for use in a multi-wavelength transmitter can be used.

The WMUX is usually implemented by an Arrayed Waveguide Grating (AWG). The function outlined in FIG. 2, is typically of a cyclic type, where port #1 uses wavelength $\lambda_1$, $\lambda_{N+1}, \lambda_{2N+1}$, and so on. In the present case, it is possible to use separate wavelengths for the upstream and downstream. In case the AWG is non-cyclic, dual-fiber schemes may be used instead of single-fiber schemes. As a further alternative, bi-directional transmission on the same, or nearly the same wavelength may be applied.

In PON systems it is common that one group of wavelength channels is used for the downstream and another group is used for the upstream. These two groups are normally referred to as different "bands" where these bands are often separated by a guard band of e.g. 15 nm. Typically the channel spacing within one band is 100 GHz, 50 GHz or 25 GHz. For the case of a cyclic AWG, the channel spacing in different bands is not equal due to material and design parameters and choices.

If the WMUX only has one wavelength for each port, i.e. it is a cyclic, bidirectional transmission on the same wavelength can be used. Other alternative embodiments may exist, such as e.g. a dual-fiber system using two WMUX's.

There are a number of ways to implement a tunable laser, with different advantages and complexity. However, in most of the implementations it is difficult, if not impossible, to obtain continuous tuning of the wavelength across the entire wavelength span of the laser. Instead, many tunable lasers exhibit continuous tuning across a limited range. Further, there are a number of lasing modes which together covers the complete wavelength range of interest. A typical behavior of a plurality of modes is illustrated in FIGS. 3a and 3b, where a dependency of change of wavelengths $\lambda_1 \ldots \lambda_8$, for the respective modes in relation to tuning control is shown.

In optical transport systems having a tunable laser with a temperature controlling functionality the temperature controller is configured to keep the laser at a fixed temperature, which may typically be set to 25° C. In such a system, the initial setting is typically retained throughout the system operation, or until the system wavelength is reconfigured. Such a temperature control does however significantly add to the cost of the tunable laser.

Normally the transport system use temperature control to cope with temperature changes. If tunable lasers could operate without temperature control significant cost savings would be realized. Mainly for economical reasons, access networks would preferably use lasers transmitters without any temperature control mechanism. A tunable laser has distinct laser modes which can be tuned over a specific wavelength range. When the temperature changes, the respective wavelength of each mode will shift as indicated in FIGS. 3a and 3b. To cover the entire wavelength range, a laser control circuit therefore must select a laser mode and control the tuning of the selected laser mode. In the following, the upstream link is considered, i.e. a transmitter of the tunable laser is arranged at an ONU and a corresponding receiver for receiving transmitted data is arranged at the OLT. However, the concept suggested in this document can be applied also to the downstream link, i.e. for a transmitter of a tunable laser which is arranged in the OLT, wherein the corresponding receiver is arranged in an ONU or ONT.

For use in access systems, a tunable laser would normally need to operate without temperature control, applying a way of oparation typically referred to as an uncooled operation. One type of such a tunable laser is the so called MGYSOA tunable laser. In such a system, the laser temperature would normally follow the environment over a temperature span from 0° C. to 70° C. Over the applied temperature range, the wavelength of a specific laser mode will therefore shift as shown in FIG. 3b.

In order for the tunable laser to maintain on a specific wavelength during a temperature change, a transmitter on one laser mode 300, would track the wavelength with it tuning control until it reaches the lower limit on the tuning control. At this point, the transmitter would switch to the next mode, indicated as mode 301 in FIG. 3b, and adjust the tuning control accordingly.

An example of a mode control and a corresponding tuning control for a wavelength varying over time according to FIG. 4a is illustrated in FIGS. 4b and 4c, respectively. During a mode change, transmission need to be interrupted, due to the un-stable wavelength which is evident in FIG. 4a from the time instance of the change of mode and for the duration of a limited time instance, here indicated as Ts. Due to this interruption, the receiver may need to be resynchronized, which may lead to traffic loss during the mode switch.

SUMMARY

It is an object of the present document to address at least some of the problems outlined above. More specifically it is an object of the present document to provide a method and arrangements suitable for handling a mode change in a tunable laser transmitter when arranged in an optical network.

According to one aspect a method executable at an optical transmitting arrangement comprising a tunable laser transmitter for controlling a mode change of the laser transmitter during transmission of data to an optical receiving arrangement is provided. The mode change is controllable by selecting a time instance for initiation of the mode change on the basis of the state of the tunable laser and by assuring that user data of the data transmission is buffered during the mode change. By applying such a method, the mode change may be postponed to a time instance which according to certain specific circumstances is more suitable. In addition, by initiating data buffering in association with a mode change no user data will be lost during the mode change.

A mode changing process according to one embodiment comprises monitoring of the state of the tunable laser transmitter, wherein a time instance for initiating the mode change is selected on the basis of the monitored state, after which buffering of data of the data transmission and initiation of the mode change is initiated at the selected time instance. The interrupted data transmission can then be resumed once it has been determined that the tunable laser transmitter has reached a stable state.

In addition to monitoring the state of the tunable laser, one or more additional data sources may be monitored and used as a basis for the determination of a time instance for a mode change. According to one alternative embodiment the state of the data transmission may be monitored, while according to yet another embodiment the data buffer occupancy may be monitored. As a consequence one or more of the monitored measures may be used for determining when to change mode in combination with the monitored state of the tunable laser.

According to one embodiment data transmission that has been interrupted in association with a mode change may be resumed on the basis of a timer value, which has typically been selected such that it reflects a normal time for the tunable laser transmitter to reach a stable state. If a timer is applied it is therefore started when the mode change is initiated, and the interrupted data transmission is resumed upon recognizing a timeout of the timer, i.e. after a time duration which is considered to be sufficient for the tunable laser transmitter to reach a stable state.

Alternatively, an interrupted data transmission may instead be resumed on the basis of signaling exchanged between the optical transmitting arrangement and the optical receiving arrangement. According to one embodiment the optical transmitting arrangement may therefore notify the optical receiving arrangement that a mode change has been initiated. The interrupted data transmission is then resumed when a notification indicating that the channel on which the data transmission was transmitted is re-established. Obviously such an event only occurs after the tunable laser transmitter has reached a stable state.

If signaling between the optical transmitting arrangement and the optical receiving arrangement is to be applied, a method executable at the optical receiving arrangement will be necessary. Such a method may be achieved by the optical receiving arrangement receiving a notification of an initiated mode change from the optical transmitting arrangement, wherein the notification is an indication to the optical receiving arrangement that an ongoing data transmission will be terminated and that data of the data transmission will be buffered during the mode change.

In addition to being notified when a mode change has occurred at an optical transmitting arrangement, the optical receiving arrangement may also be configured to notify the optical transmitting arrangement when it is ready to resume data reception, and consequently, when the optical transmitting arrangement can resume data transmission.

According to one embodiment, such a notification may be based on a timer functionality, such that a timer, set to a predefined time interval, is started in response to receiving a notification of a mode change from the optical transmitting arrangement, and such that the optical transmitting arrangement is notified of the fact that the channel used for the data transmission is re-established, in response to recognizing a time-out of the timer at the optical receiving arrangement.

According to another aspect, an optical transmitting arrangement which is configured to execute a method according to any of the embodiments described above is provided. According to one embodiment, the optical transmitting arrangement comprises a functional unit, here referred to as a mode control unit, which is configured to select a time instance for initiation of the mode change on the basis of the state of the tunable laser transmitter and to buffer data of the data transmission at least for the duration of the mode change.

The suggested optical transmitting arrangement is typically also provided with a traffic unit which is configured to transmit data packets to the optical receiving arrangement, wherein the mode control unit comprises mode changing logic configured to monitor the state of the tunable laser transmitter, to select a time instance for initiating a mode change of said tunable laser transmitter on the basis of the monitored state; to interrupt the data transmission, and to change mode at the selected time instance. In addition the mode changing logic is configured to resume the interrupted data transmission upon determining that the tunable laser transmitter has reached a stable state.

The mode changing logic may further be configured to monitor the state of the data transmission and/or the occupancy of a buffering unit and to select the selectable time instance on the basis of one or more of the state of the data transmission, the occupancy of the buffering unit and the state of the tunable laser transmitter.

Furthermore, the mode changing logic may be configured to notify the optical receiving arrangement of a mode change in a first notification, and to resume an interrupted data transmission upon determining that the physical channel used for the data transmission has been re-established after the mode change.

According to one embodiment the mode changing logic may be configured to determine that the physical channel used for the data transmission has been re-established in response to recognizing a second notification of channel re-establishment received from the optical receiving arrangement.

According to another embodiment, the mode changing logic is further configured to start a timer in association with executing a mode change and to determine that channel has been re-established in response to recognizing a timeout of the timer.

The optical transmitter arrangement suggested above may typically be implemented in an ONU or an ONT.

According to yet another aspect an optical receiving arrangement suitable to interact with an optical transmitting arrangement, as indicated above, is provided. According to one embodiment, the optical receiving arrangement comprises logic, here referred to as signal detecting logic, which is configured to recognize a notification receive by an optical receiver of the optical receiving arrangement, wherein the notification is an indication to the optical receiver that the tunable laser transmitter will change mode, that the ongoing data transmission will be interrupted and that user data of the data transmission will be buffered for the duration of the mode change.

The signal detecting logic is typically also configured to determine when the channel used for the data transmission has been re-established, such that it can notify the optical transmitting arrangement of the re-established channel.

According to one embodiment, the signal detecting logic is configured to start a timer, set to a predefined time interval, in response to receiving a notification of an initiated mode change from the optical transmitting arrangement, and to notify the optical transmitting arrangement of the re-established channel via a second notification upon recognizing a time-out of the timer.

The optical receiving arrangement may typically be implemented in an ONU, but may alternatively be implemented in an ONT or an OLT.

One advantage with all embodiment suggested above is that no user data will be lost during a mode change.

Another advantage is that a plurality of different aspect, such as e.g. the state of the optical laser transmitter, the state of the data transmission and the occupancy of a buffer used during the mode change may be considered when choosing a time instance for changing mode.

Further features of the methods and arrangements suggested above and its benefits can be understood from the detailed description below.

BRIEF DESCRIPTION OF THE DRAWINGS

The present invention will now be described in more detail by means of exemplary embodiments and with reference to the accompanying drawings, in which:

FIG. 4b is an illustration of a mode control causing the mode change of FIG. 4a.

DETAILED DESCRIPTION

The present document refers to a process and a mechanism for handling a mode change in a tunable laser, or more specifically in a transmitter of a tunable laser, such that traffic loss is avoided during the mode change. The mechanism is based on the fact that the state of the tunable laser transmitter is monitored and a suitable time instance to initiate a mode change is selected on the basis of the monitored state. During the mode change the physical channel used for data transmission is not operational and user data is not transmitted. Instead the user data is buffered until the laser has reached a stable operation in a new mode, i.e. the wavelength of the tunable laser has stabilized. Once the stable operation has been obtained the buffering can be terminated and the interrupted transmission can be resumed.

The suggested mode changing process can be realized as a method executable at an optical transmitting arrangement comprising a tunable laser transmitter. In addition an optical transmitting arrangement which is configured to execute the suggested method is also suggested. Furthermore, a method and arrangement which can be applied in a corresponding optical receiving arrangement is also provided.

Although the examples given in this document refers to the use of an optical transmitting arrangement which is applying a mode change process in the upstream direction it is to be understood that the suggested methods and arrangement may be applied also for an optical transmitting arrangement which is operating downstream in a corresponding way.

Figure 1:
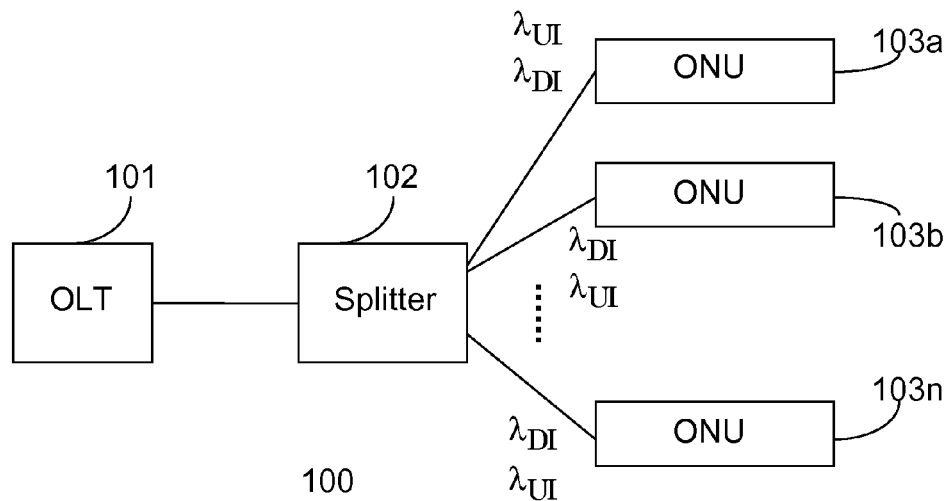
FIG. 1 is an overview of a fiber-based broadband network, according to the prior art.
Figure 2:
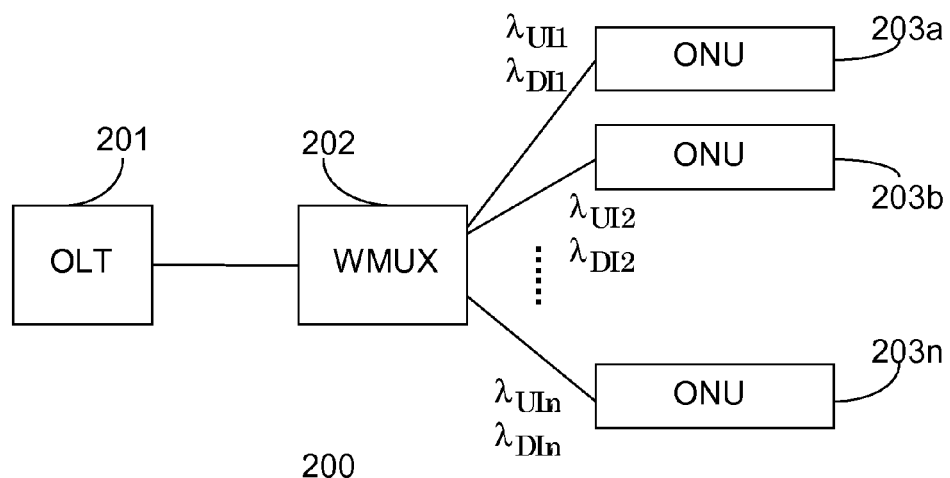
FIG. 2 is another overview of another fiber-based broadband network, according to the prior art.
Figure 3A:
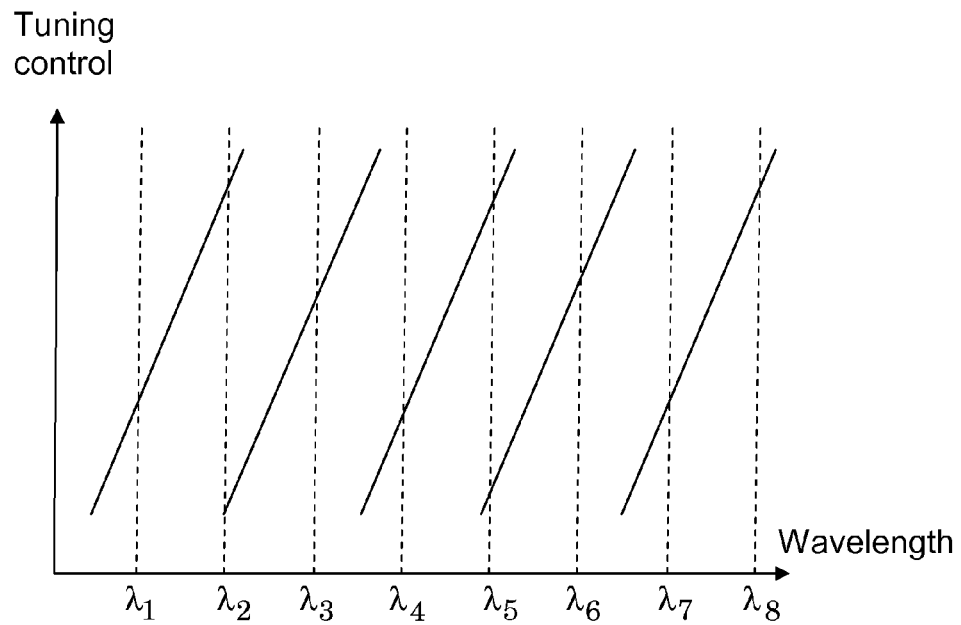
FIG. 3a is an illustration of a possible coverage of a wavelength range of a tunable laser having a plurality of tunable modes.
Figure 3B:
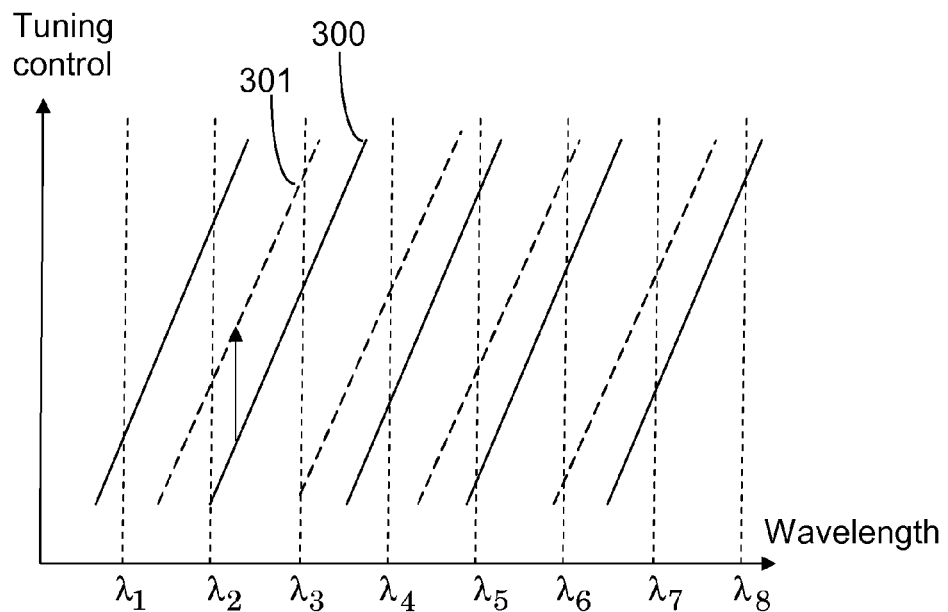
FIG. 3b is another illustration of how the different laser modes of FIG. 3 may behave when the operating temperature of the tunable laser changes.
Figure 4A:
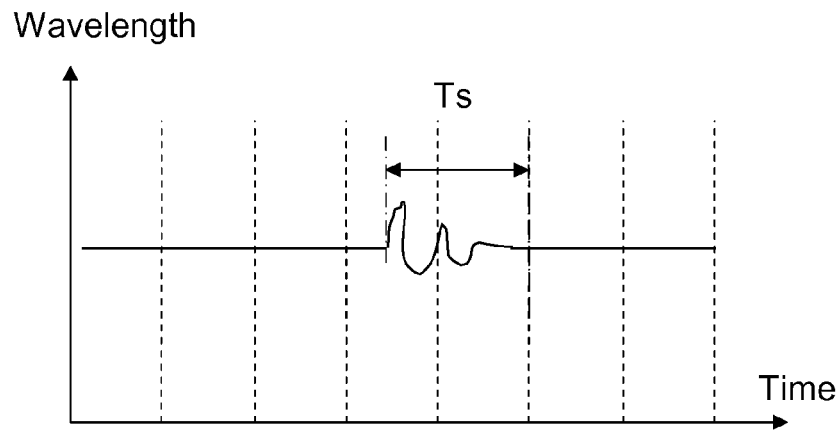
FIG. 4a is an illustration of a wavelength over time, where the wavelength is experiencing a distortion in association with a mode change.
Figure 4B:
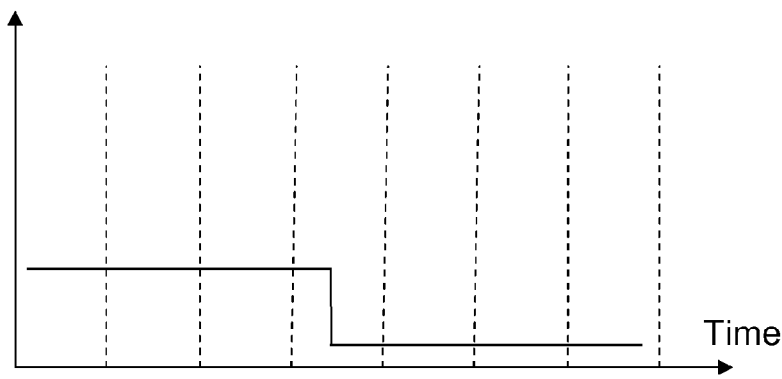
Figure 4C:
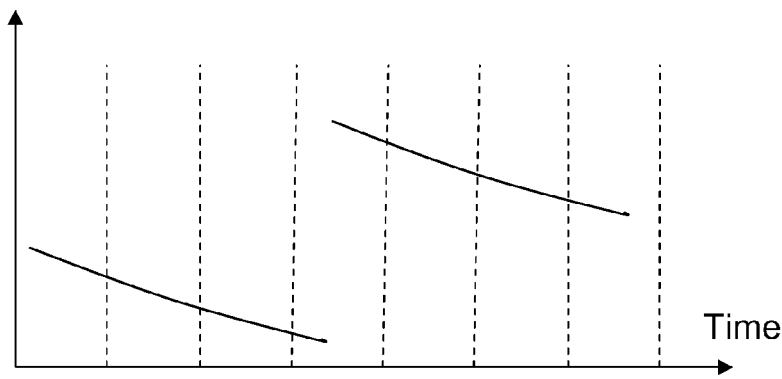
FIG. 4c is an illustration of a tuning control over time which may cause the mode change of FIGS. 4a and 4b
Figure 5:
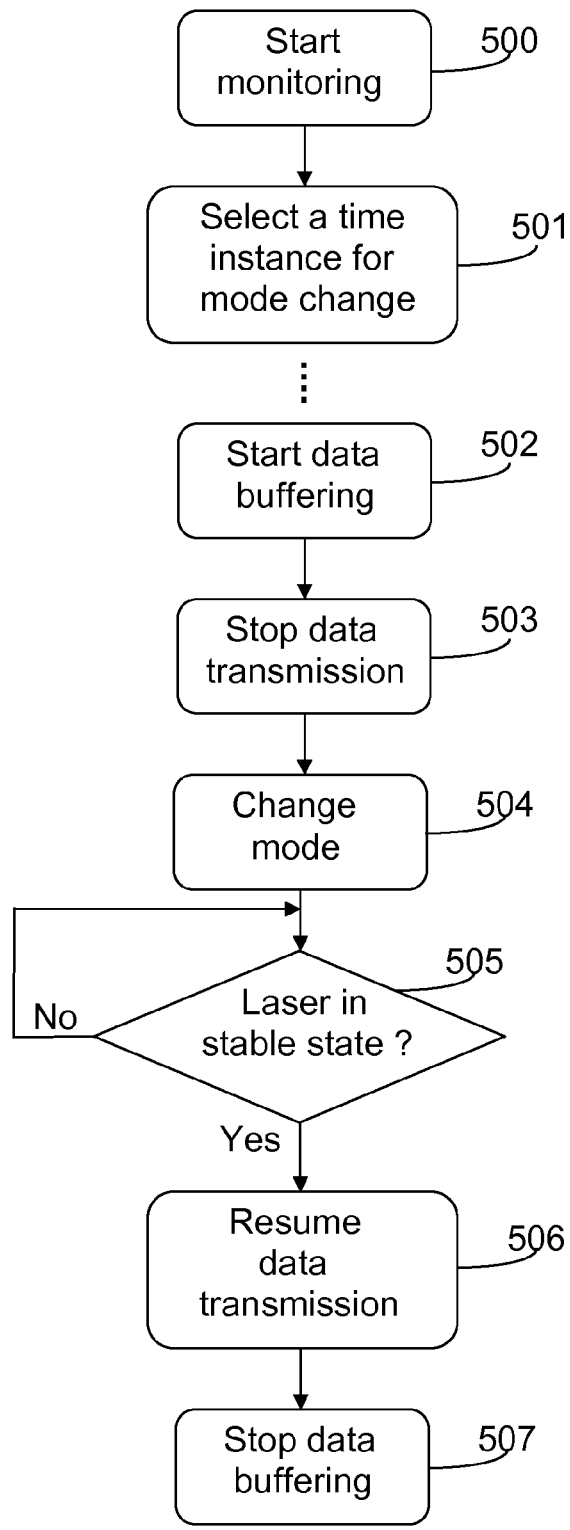
FIG. 5 is a flow chart illustrating a method for executing a mode change in a transmitter of a tunable laser according to one embodiment.

A method for changing mode of a tunable laser transmitter according to one exemplary embodiment will now be described in more detail with reference to FIG. 5. In a first step 500 a process for enabling the time instance for initiating a mode change to be dynamically chosen is started by initiating monitoring of the state of the tunable laser transmitter. Once started the monitoring typically commences on a continuous basis. In a next stage a suitable time instance for executing an upcoming mode change is selected on the basis of the monitored state. This is indicated with a next step 501. If more parameters than the state of the tunable laser is to be considered, monitoring of these additional parameters may also start in step 500.

Once a time instance for mode change has been settled, data buffering of ongoing traffic can commence, as indicated with another step 502, and the transmission of user data is interrupted, as indicated in a step 503, and replaced by transmission of idle data, such that the actual mode change can be executed, as indicated in a subsequent step 504, without having a risk of losing user data during the mode change. According to the suggested method, the initiated data buffering continues for the duration of the mode change and as long as it is considered that the tunable laser transmitter remains in an un-stable state.

The monitoring may also comprise monitoring of the state of an ongoing data transmission, wherein mode changing step 504 may be based not only on the state of the tunable laser transmitter but also on the state of the data transmission executed by the tunable laser transmitter. By monitoring also the state of the data transmission, the time instance for executing the mode change may e.g. be adapted to the expected load of the buffer, such that the time instance can be selected when there will likely be adequate buffer capacity available.

On the basis of the continuing monitoring of the state of the tunable laser transmitter it is possible to determine when the tunable laser transmitter has resumed a stable state, as indicated with a step 505, and once it is determined that the tunable laser transmitter has once again reached a stable state, transmission of user data is resumed, as indicated with another step 506, and the buffering can be stopped, as indicate in a subsequent step 507.

If the duration of the time until the transmission is re-established after a mode change is known, step 505 may be determined on the basis of a timer, which is started in association with the mode change and stopped after a certain timer value has elapsed. The timer value is typically set such that the mode change can be completed and the interrupted transmission of user data can be resumed with a required margin.

The mode changing process suggested above may be further improved by applying signaling between the optical transmitting arrangement and the optical receiving arrangement which enables the optical transmitting arrangement to inform the optical receiving arrangement when a mode change is, or is to be executed. In addition, the optical receiving arrangement may be able to notify the transmitter when the physical channel used for the data transmission is re-established after a mode change.

Figure 6:
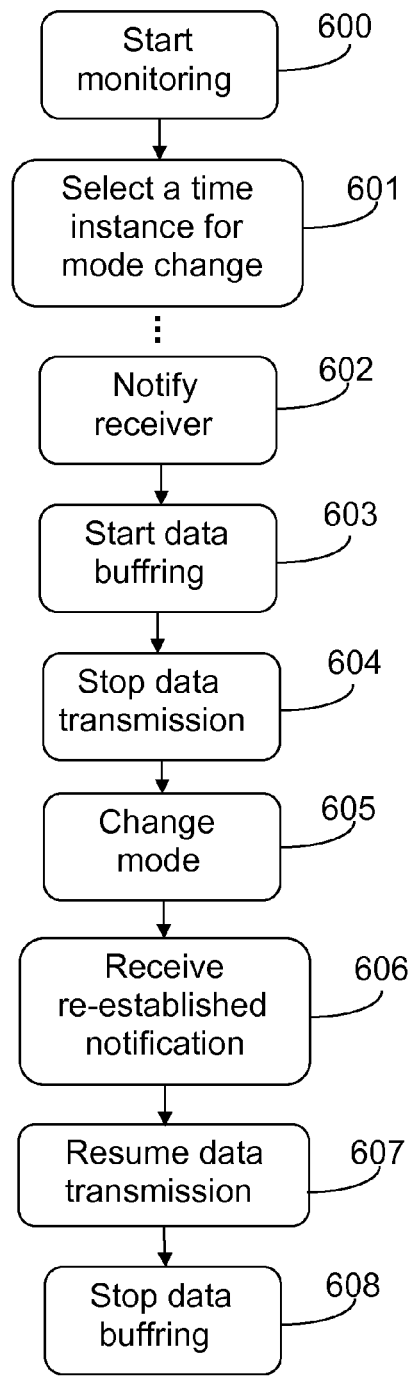
FIG. 6 is another flow chart illustrating a method for executing a mode change in a transmitter of a tunable laser according to another embodiment.

Such an alternative method, which will now be described in further detail with reference to FIG. 6, starts in the same way as the method described above with reference to FIG. 5 with executing corresponding steps 600 and 601. Once a time instance for a mode change has been selected in step 601, the optical transmitting arrangement provides a notification to the optical receiving arrangement that the transmission of user data traffic is to be interrupted and that a mode change is about to be executed, as indicated with a step 602. The method then continues by executing steps 603-605, in a corresponding way to the execution of steps 502-504 indicated in FIG. 5. Once it has been determined at the optical receiving arrangement that the channel used for data transmission has been re-established the optical transmitting arrangement is notified of this state, as indicated with a next step 606, and the transmission of user data can be resumed, as indicated in a step 607. The data buffering is however typically not interrupted until a notification of a resumed data transmission has been received from the optical receiving arrangement, as indicate in step 608.

Figure 7:
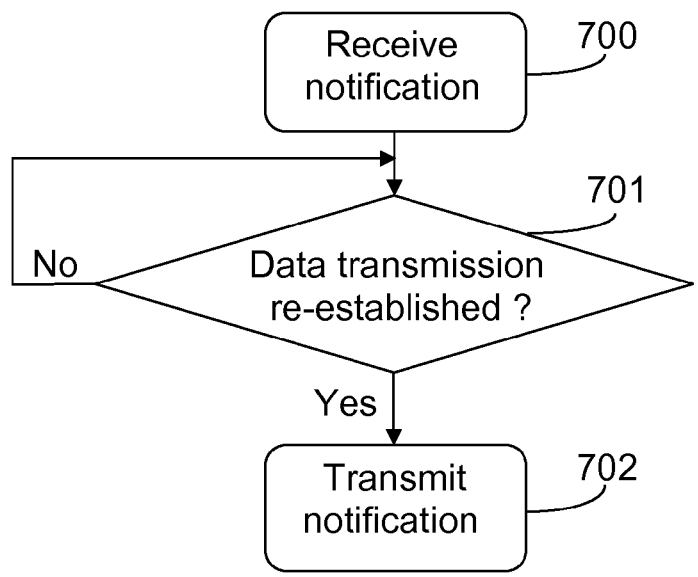
FIG. 7 is yet another flow chart illustrating a method to be executed in a receiver receiving data from a transmitter being involved in a mode change according to the method of FIG. 6, according to one embodiment.

IF the alternative method mentioned above is to be applied, a corresponding process has to be executable also in the optical receiving arrangement Such a method, according to one exemplary embodiment is illustrated in FIG. 7, where, in a first step 700, the optical receiving arrangement receives a notification of an upcoming mode change from an optical transmitting arrangement from which it is receiving data traffic. Once such a notification has been received, the optical receiving arrangement uses an appropriate process for determining when the data transmission has been re-established, i.e. when data is once again received in a conventional manner, as indicated in another step 701. When it is determined that the data transmission has been re-established, a notification of the re-establishment may be transmitted to the optical transmitting arrangement as indicated in a final step 702.

By applying a notification mechanism between the optical receiving arrangement and the optical transmitting arrangement, as suggested above, alarms that would possibly otherwise have been generate by the OLT in the absence of an input signal may be suppressed or postponed in time for the tunable laser transmitter to re-establish. Notifications may also be to prefer in situations where the duration of interruptions of user data due to a mode change is unknown, or if such a time duration is known, in case the duration is known to vary between different end units.

Figure 8:
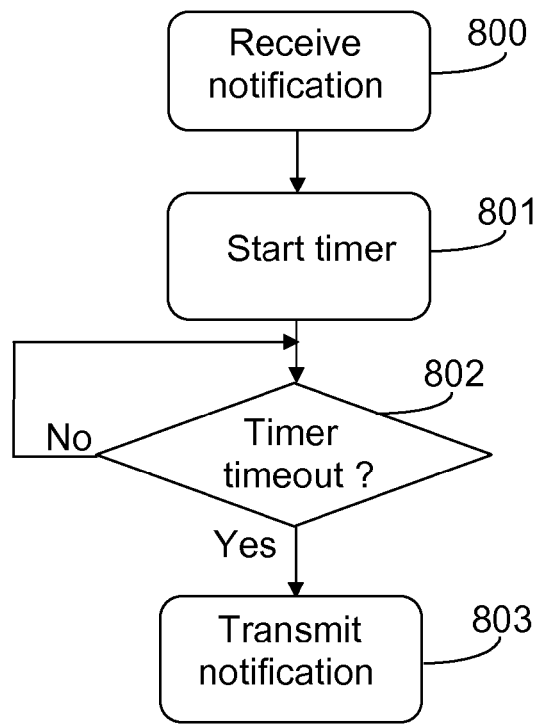
FIG. 8 is another flow chart illustrating a method to be executed in a receiver receiving data from a transmitter being involved in a mode change according to the method of FIG. 6, according to another alternative embodiment.

According to yet another alternative embodiment, the feature of notifying the optical transmitting arrangement of data transmission re-establishment in the optical receiving arrangement may be combined with the use of a timer. Such an alternative method is illustrated in FIG. 8. In a first step 800, a notification of a mode change is received by the optical receiving arrangement. In a next step 801 a timer which is set to a timer value, which is typically estimated to have a time duration long enough for the data transmission to have been re-established after the execution of a mode change is started. Upon timer timeout, monitored in a next step 802, the receiver automatically provides a notification of data transmission re-establishment, as indicated in a final step 803.

There are a plurality of alternative methods for determining that a data transmission is actually re-established which are well known to the person skilled in the art, and thus a person skilled in the art may therefore without requiring any inventive skill implement such a method together with the mode change process and the mechanism described in this document. These issues will therefore not be discussed in any further detail in this document.

Figure 9:
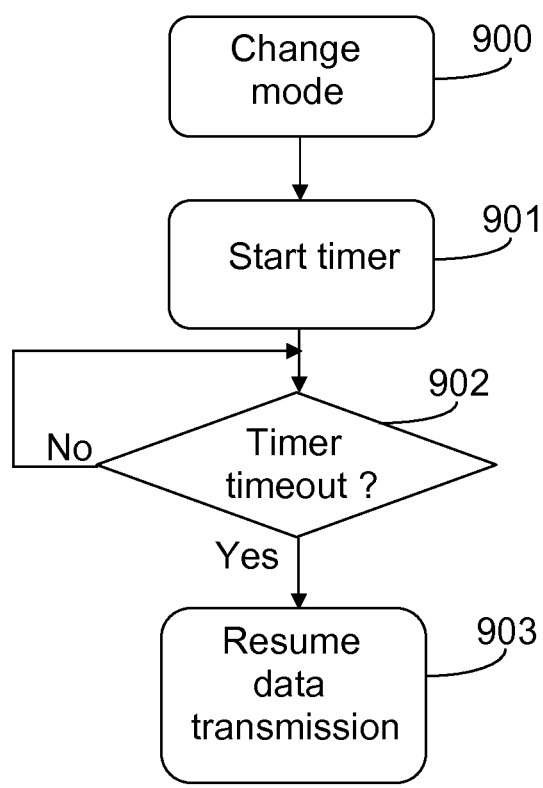
FIG. 9 is a flow chart illustrating a method to be executed in a transmitter transmitting data to a receiver when being involved in a mode change according to one embodiment.

In a corresponding to the use of a timer at the receiving side, the transmitting side may be provided with timer functionality, such that the data transmission interrupted in association with a mode change can be resumed when a time interval has elapsed since the mode change was executed. Such a method according to one exemplary embodiment is illustrated in FIG. 9, where a mode change, executed in a step 900 triggers the starting of a timer, as indicated in a subsequent step 901. When the timer value, as interrogated in another step 902, has elapsed, the interrupted data transmission is resumed, as indicated with a step 903.

Typical times to change mode could be in the order of ms or less, but the required time for changing mode vary between different laser types. For a given mode change time, there is typically a trade-off between the risk of filling up the buffer, and dropping packets, and buffer size to consider. Recognizing that different traffic types are more or less sensitive to packet loss, e.g. file download vs. video, a smaller buffer size would be acceptable if packets were classified for different sensitivity to packet loss. For a 1 GbE line rate and a mode change time of 1 ms, a buffer size of 125 kB may secure good transmission for most types of traffic. If a lower buffer size is required, a 10 kB buffer may be adequate, wherein for example 80 Mbps of sensitive traffic, such as e.g. video, would be protected against packet drops.

In a simple implementation, the transmitter may operate autonomously, while such a configuration may be undesirable in other systems. The optical transmitting arrangement needs to interrupt, or disable, the user data transmission until it is certain that the physical channel is re-established, which may introduce additional delay in the mode switch process, and lead to larger buffer requirement. The OLT may also be provided with alarm functionality which is configured to trigger on short loss of signal in the upstream transmission which may occurs during a mode switch. An alarm may also be configured such that the triggering of the alarm is delayed for a pre-determined time interval, thereby allowing the channel to re-establish, and thus avoiding unnecessary alarms.

An optical transmitting arrangement suitable for implementation in a tunable laser transmitter and for executing a mode changing method such as any of the alternative methods described above will now be described in more detail with reference to FIG. 10. The suggested mode changing process is typically applied in an optical network when it is operating upstreams, where the optical transmitting arrangement 1000 is implemented in an ONU or an ONT. The arrangement may however alternatively be implemented in an OLT, such that a mode change according to any of the methods suggested above can be applied downstreams.

It is to be understood that even though a conventional ONT or ONU comprising an optical transmitter arrangement comprises additional functionality which is necessary for enabling processing and transmission of data to an OLT comprising an optical transmitting arrangement, any such functionality which is not necessary for the understanding of the suggested mode changing mechanism has been omitted in the figure for simplicity reasons.

Figure 11:
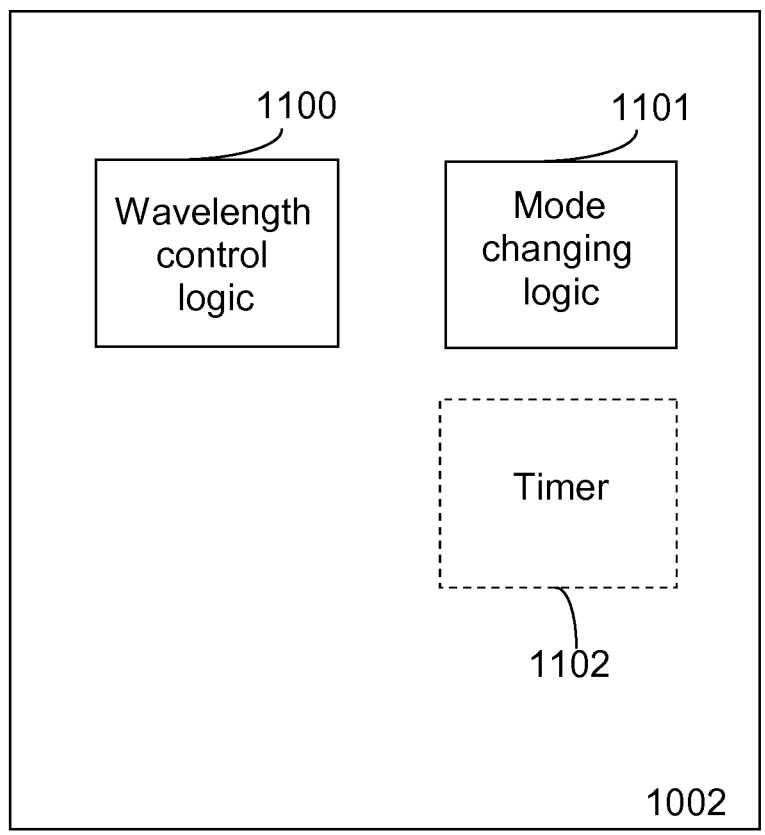
FIG. 11 is a simplified scheme of a configuration of a mode control unit of an optical transmitting arrangement according to one embodiment.
Figure 12:
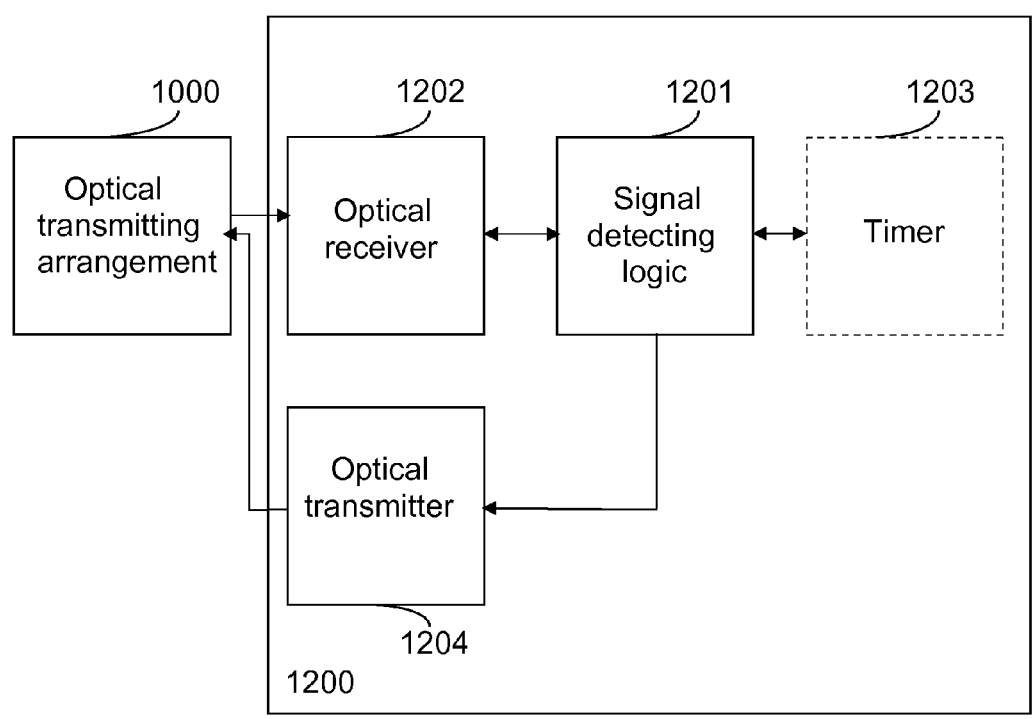
FIG. 12 is another block scheme illustrating an optical receiving arrangement, according to one embodiment.

Below an optical transmitting arrangement according to one embodiment will be described in further detail with reference to FIGS. 10 and 11, while an optical receiving arrangement which is configured to provide two way communication with an optical transmitting arrangement, while receiving user data from the optical transmitting arrangement will be described with reference to FIG. 12. It is to be understood that the block schemes as presented in FIGS. 10-12 are simplified descriptions where functional units which are usually present in a conventional transmitting or receiving arrangement, respectively, which are not necessary for the understanding of the methods and mechanisms which are the focus of this document have been omitted for simplicity reasons. It should also be noted that the units described in this document are to be regarded as logical entities and not with necessity as separate physical entities.

Figure 10:
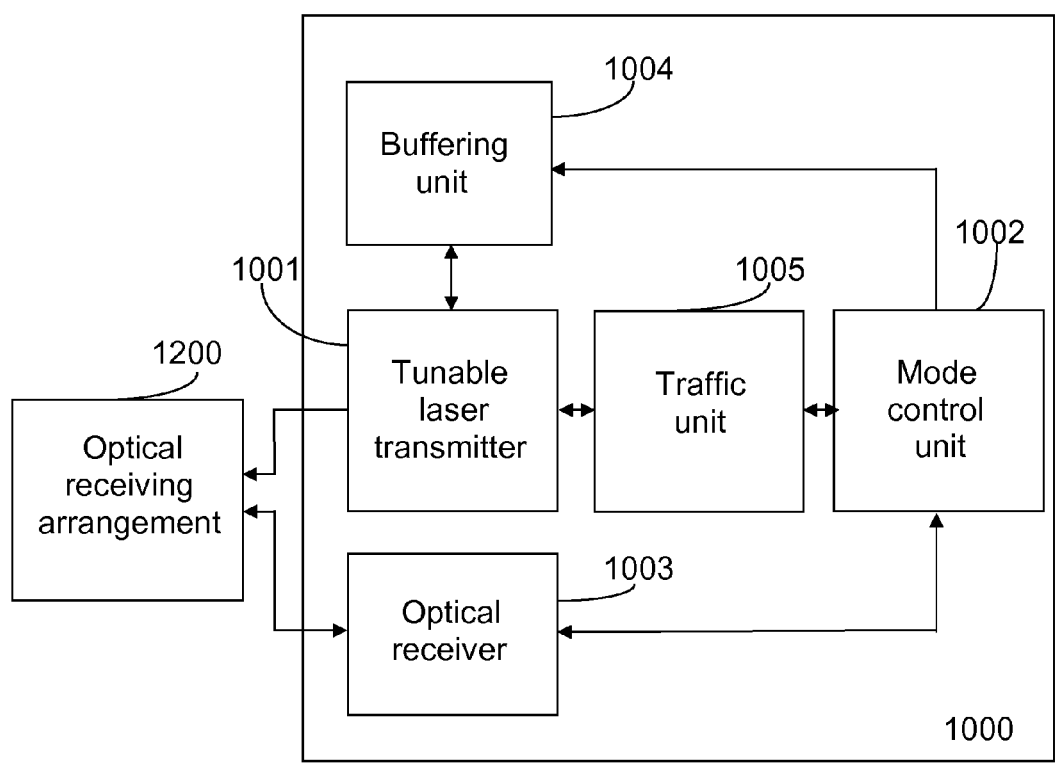
FIG. 10 is a simplified block scheme illustrating an optical transmitting arrangement, according to one exemplary embodiment.

According to FIG. 10, an optical transmitting arrangement 1000 comprising a tunable laser transmitter 1001 is provided with functionality for controlling a mode change during transmission of data to an optical receiving arrangement 1200. The optical transmitting arrangement 1000 is configured to select a time instance for initiation of the mode change on the basis of the state of the tunable laser transmitter 1001 and to manage buffering of user data of the data transmission during the initiated mode change. The traffic unit is configured to enable transmission of data packets to the optical receiving arrangement 1200 via the tunable laser transmitter 1001, typically by transforming data packets to be transmitted into serial data. The traffic unit 1005 typically contains priority queues and the medium access control (MAC). In addition, the traffic unit 1005 may also comprise one or more buffers which in that case replaces buffering unit 1004 of FIG. 1000.

More specifically the optical transmitting arrangement 1000 comprises functionality, here provided in a mode control unit 1002, which is configured to control the tunable laser transmitter 1001 during a mode change, as suggested above. The mode control unit 1002 is operatively connected to the tunable laser transmitter 1001 via a traffic unit 1005, to a buffering unit 1004 for buffering user data during the mode change, and to an optical receiver 1003, for enabling two-way communication with the optical receiving arrangement 1200.

In order to provide a controllable mode changing functionality the mode control unit 1002 is provided with specially adapted logic, which may be implemented as software, hardware, or a combination thereof. FIG. 11 is illustrating one exemplifying configuration of a mode control unit according to one embodiment.

The mode control unit 1002 exemplified in FIG. 11 comprises mode changing logic 1101 configured to monitor the state of the tunable laser transmitter 1001, to select a time instance for initiating a mode change of the tunable laser transmitter 1001 on the basis of the monitored state, and to start buffering user data of the data transmission, to interrupt the data transmission and to change mode at the selected time instance. The mode changing logic 1101 may also be configured to monitor other data, such as e.g. the state of the data transmission and or the availability of the buffer. In addition, the mode changing logic 1101 is configured to resume the interrupted data transmission and to stop the buffering upon determining that the tunable laser transmitter 1001 has reached a stable state and/or that the channel used for the transmission of user data has re-established.

The mode control unit 1002 also comprises wavelength control logic 1100, which is configured to steer different control current of the tunable laser transmitter 1001, such that the output wavelength can be adjusted to a correct value. By monitoring the state of the wavelength control logic 1100, the mode changing logic 1101 will thus be able to detect when the wavelength control logic 1100 is about to switch the tunable laser transmitter 1001 to a different laser mode. Thereby, the mode changing logic 1101 can obtain an indication of the state of the tunable laser transmitter 1001 by making use of the wavelength control logic 1101.

The mode changing logic 1101 is further configured to resume the data transmission upon determining, on the basis of the state of the tunable laser transmitter 1001, that the laser has reached a stable state. Alternatively, the mode changing logic 1101 may be provided with a timer 1102, which enables the mode changing logic 1101 to control the interruption and resuming of the data transmission, such that the timer 1102 is started when the data transmission is interrupted, in association with a mode change, and such that the data transmission is resumed when a timer value of the timer has elapsed, i.e. upon timer timeout.

As an alternative to consider only the state of the tunable laser transmitter 1001, the mode changing logic 1101 may be configured to monitor also the state of the data transmission and to select the selectable time instance for the mode change such that both the state of the data transmission and the state of the tunable laser transmitter 1001 can be considered.

The mode changing logic 1101 may further be configured to also consider the occupancy of the buffering unit 1004 and to choose the selectable time instance on the basis of the state of the data transmission and/or the occupancy of the buffering unit 1004 in addition to the state of the tunable laser transmitter 1001.

The mode changing logic 1101 may also be configured such that criteria used for selecting the time instance for executing the mode change may vary over time, or other criteria, such as e.g. type of traffic in the data transmission.

The optical transmitting arrangement 1000 may also be configured such that it can exchange information with an optical receiving arrangement 1200, in order to further improve the suggested mode changing process. According to one embodiment, the mode changing logic 1101 is therefore also configured to notify the optical receiving arrangement 1200 of a mode change by transmitting such a notification, here referred to as a first notification, via the tunable laser transmitter 1001. According to the same embodiment, the mode changing logic 1101 is also configured to resume the interrupted user data transmission when it has determined that the physical channel used for the data transmission has been re-established after the mode change.

According to one exemplary embodiment the mode changing logic 1101 is configured to determine that the channel has been re-established upon recognizing another notification, here referred to as a second notification, received from the optical receiving arrangement 1200 and indicating channel re-establishment at the optical receiving arrangement.

According to another exemplary embodiment the mode changing logic 1101 does not have to rely on reception of a notification from an external entity for determining that the interrupted data transmission can be resumed. Instead the mode changing logic 1101 may be configured to start a timer 1102 in association with executing the mode change and to determine that the channel has been re-established in response to recognizing a timeout of the timer 1102. If such a timer is applied, the timer is typically set to a timer value which corresponds to an expected time interval for the channel to re-established, typically with some extra margin which may depend on the type of tunable laser transmitter, added.

In one embodiment, an optical transmitting arrangement, such as the one described above may operate with an optical receiving arrangement comprising a conventional optical receiver. If, however, some type of signaling between the optical transmitting arrangement and the optical receiving arrangement is required, the optical receiving arrangement will have to be adapted accordingly. Such an optical receiving arrangement according to one exemplary embodiment will therefore be described in further detail below with reference to FIG. 12.

The optical receiving arrangement 1200 of FIG. 12 comprises an optical receiver 1202 for receiving data transmitted from an optical transmitting arrangement 1000, comprising a tunable laser transmitter. The optical receiving arrangement 1200 comprises signal detecting logic 1201 which is configured to recognize a notification, here referred to as a first notification, received by the optical receiver 1202, indicating an initiated mode change of the tunable laser transmitter of the optical transmitting arrangement 1000, wherein the first notification is an indication to the optical receiving device 1200 that the tunable laser transmitter 1001 is about to change mode.

In order to make full use of the first notification the optical receiving arrangement 1100 requires some functionality for enabling it to determine when a channel used for data transmission can be expected to have re-established. According to one embodiment, the signal detecting logic 1201 is configured to notify the optical transmitting arrangement of the re-established state via a notification, here referred to as a second notification. Such a re-established state may be determined by using one of a plurality of methods which are presently known in this technical field, and thus, since this specific technique is out of focus of this application, these issues will not be discussed any further in this document.

According to an alternative embodiment the signal detecting logic 1201 is instead configured to start a timer 1203 set to a time interval, which is typically selected according to an expected time interval for the channel re-establish, in response to receiving the first notification from the optical transmitting arrangement 900, and to notify the optical transmitting arrangement 1000 of the re-established channel via a second notification transmitted via an optical transmitter 1204 upon recognizing a time-out of the timer 1203.

If used upstreams, the optical receiving arrangement described above may typically be provided as a part of an OLT. However, in correspondence to what has been mentioned above, an optical receiving arrangement may alternatively be implemented in an ONU or ONT, if the suggested mode change process is to be applied downstreams.

While the suggested mode change process, and mechanism for executing the process, has been described with reference to specific exemplary embodiments, the description is generally only intended to illustrate the inventive concept and should not be taken as limiting the scope of the invention, which is defined by the appended claims.

ABBREVIATIONS

AWG Arrayed Waveguide Grating
CATV Cable television
EPON Ethernet Passive Optical Networks
FTTB Fiber To The Building
FTTC Fiber To The Curb
FTTH Fiber To The Home
GPON Gigabyte-capable Passive Optical Network
HDTV High Definition Television
OLT Optical line Terminal
ONT Optical Network Terminal
ONU Optical Network Unit
PON Passive Optical Network
TDM lime Division Multiplex
VoIP Voice Over Internet Protocol
WDM-PON Wavelength Division Multiplexing Passive Optical Network
WMUX Wavelength Multiplexer/Demultiplexer

The invention claimed is:

1. A method at an optical transmitting arrangement comprising a tunable laser transmitter for controlling a mode change of the tunable laser transmitter executed during transmission of data to an optical receiving arrangement, the method comprising:
monitoring a state of the tunable laser transmitter and a state of the data transmission;
selecting, on the basis of the monitored state of the tunable laser transmitter and the state of the data transmission, a time instance for initiating the mode change;
starting buffering user data of the data transmission, interrupting the data transmission and initiating the mode change at the selected time instance;
buffering user data of the data transmission during the mode change;
notifying, upon initiating the mode change, the optical receiving arrangement of said mode change, said interrupting of the data transmission, and said buffering of user data of the data transmission for a duration of said mode change with an indication; and
resuming the interrupted data transmission upon determining that the tunable laser transmitter has reached a stable state.

2. The method according to claim 1, wherein the monitoring step comprises a further step of monitoring occupancy of a data buffer of the tunable laser transmitter and wherein the selecting step is based on the state of the tunable laser transmitter, and one or more of: the state of the data transmission, and the data buffer occupancy.

3. The method according to claim 1, comprising the further steps of:
starting a timer upon having initiated the mode change at the selected time instance, and resuming the interrupted data transmission upon recognizing a timeout of said timer.

4. The method according to claim 1, comprising a further step of:
resuming the interrupted data transmission upon receiving, from the optical receiving arrangement, a notification that a channel on which the data transmission was transmitted is re-established.

5. An optical transmitting arrangement for controlling a mode change of a tunable laser transmitter comprised in said optical transmitting arrangement during transmission of user data to an optical receiving arrangement, wherein the optical transmitting arrangement comprising:
a traffic unit configured to transmit data packets to the optical receiving arrangement; and
a mode control unit which is configured to select a time instance for initiation of the mode change on the basis of a state of the tunable laser transmitter, wherein said mode control unit comprises:
a mode changing logic configured to:
monitor the state of the tunable laser transmitter and a state of the data transmission;
select, on the basis of the monitored state of the tunable laser transmitter and the state of the data transmission, a time instance for initiating a mode change of said tunable laser transmitter;
interrupt the data transmission at the selected time instance;
change a mode of the tunable laser transmitter at the selected time instance;
buffer said user data of the data transmission at least for a duration of the mode change;
notify the optical receiving arrangement of said mode change, said interruption of the data transmission at the selected time instance, and said buffering of said user data of the data transmission at least for the duration of the mode change with a first notification; and
resume the interrupted data transmission upon determining that the tunable laser transmitter has reached a stable state.

6. The optical transmitting arrangement, according to claim 5, wherein the mode changing logic is further configured to monitor an occupancy of a buffering unit suitable for buffering said user data and to select a selectable time instance on the basis of the state of the tunable laser transmitter and one or more of: the state of the data transmission and the occupancy of the buffering unit.

7. The optical transmitting arrangement, according to claim 5, wherein the mode changing logic is further configured to resume said interrupted data transmission upon determining that a physical channel used for the data transmission has been re-established after said mode change.

8. The optical transmitting arrangement, according to claim 7, wherein the mode changing logic is configured to determine that the physical channel used for the data transmission has been re-established in response to recognizing a second notification of the channel re-establishment received from the optical receiving arrangement.

9. The optical transmitting arrangement according to claim 7, wherein the mode changing logic is further configured to start a timer in association with executing said mode change and to determine that said physical channel has been re-established in response to recognizing a timeout of said timer.

* * * * *